J. R. SNYDER.
TRIPLE VALVE.
APPLICATION FILED MAR. 21, 1912.
1,094,941.
Patented Apr. 28, 1914.
3 SHEETS—SHEET 3.
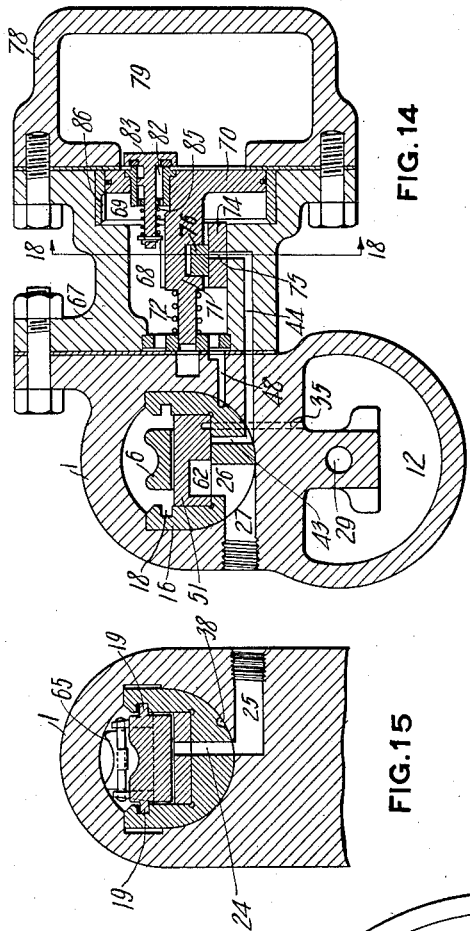
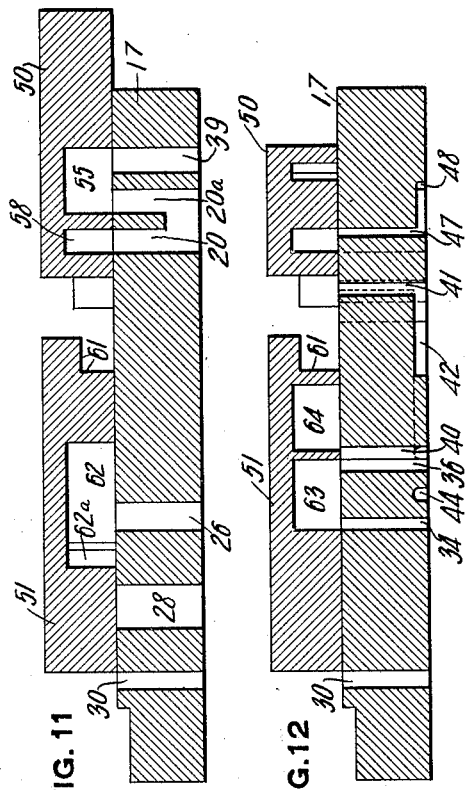
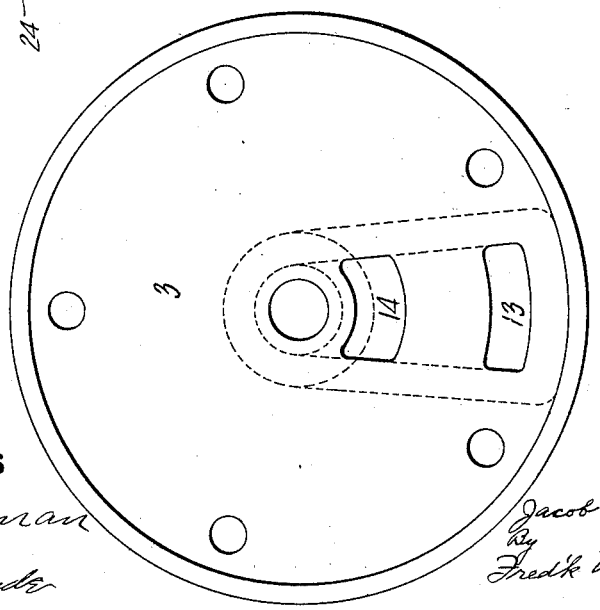
WITNESSES
INVENTOR

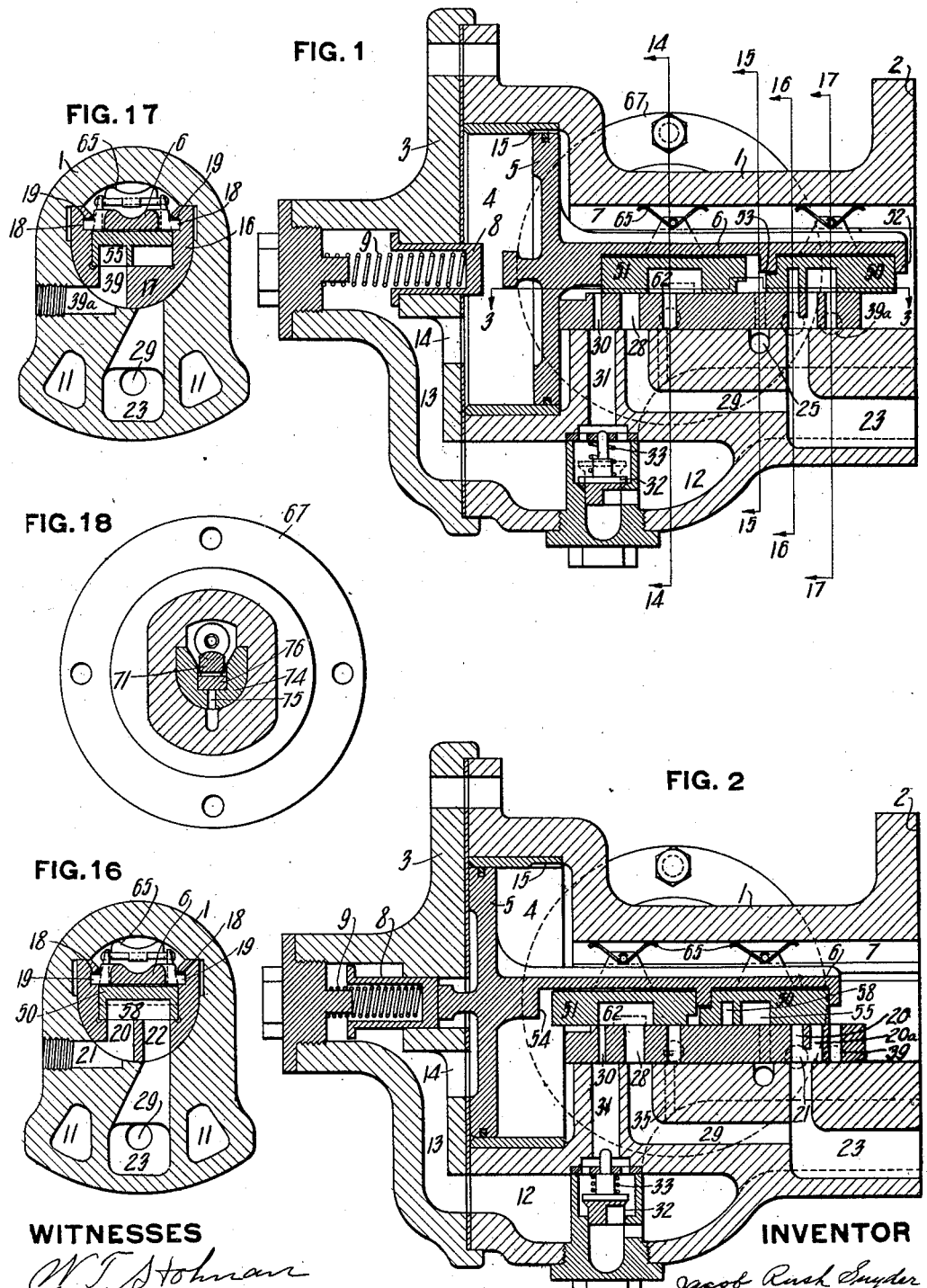

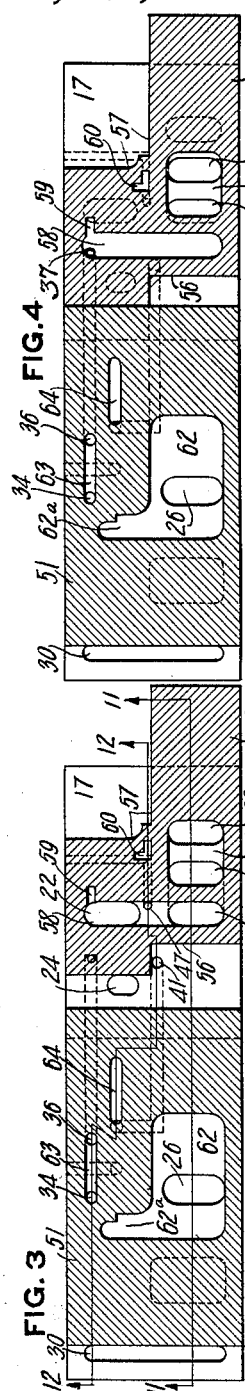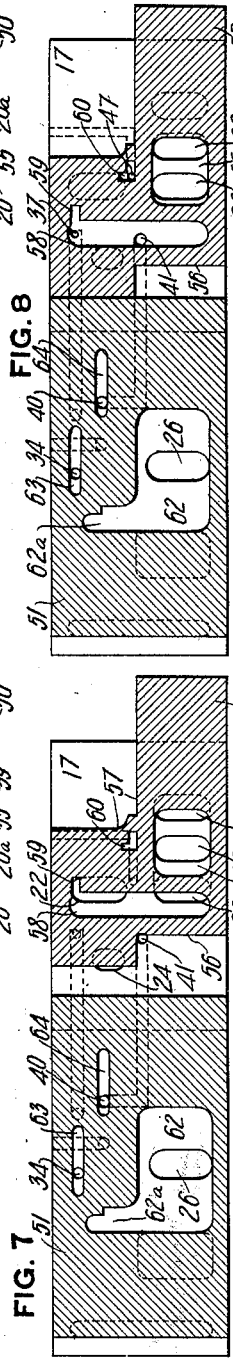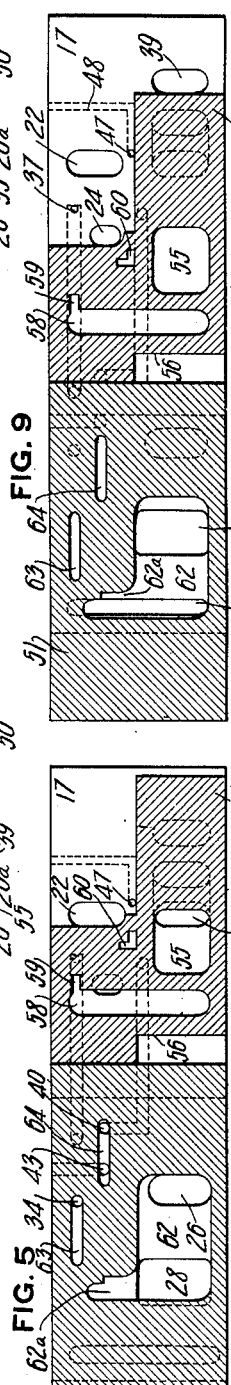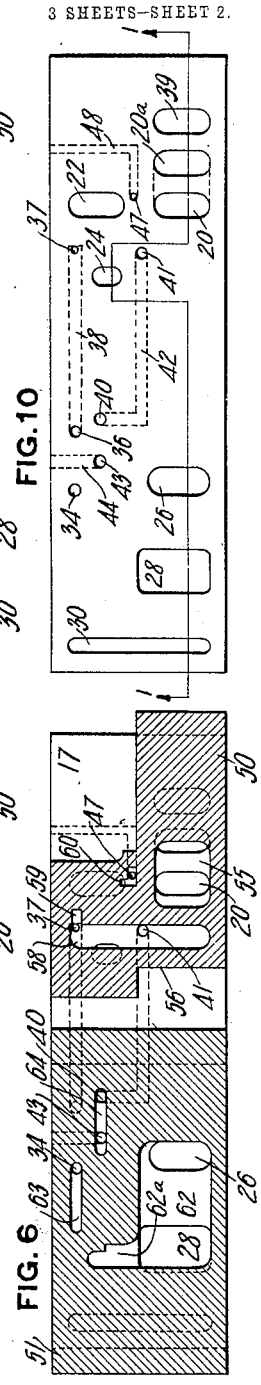

UNITED STATES PATENT OFFICE.

JACOB RUSH SNYDER, OF PITTSBURGH, PENNSYLVANIA, ASSIGNOR, BY MESNE ASSIGNMENTS, TO PITTSBURGH AIR BRAKE COMPANY, A CORPORATION OF PENNSYLVANIA.

TRIPLE VALVE.

1,094,941.     Specification of Letters Patent.     Patented Apr. 28, 1914.

Application filed March 21, 1912. Serial No. 685,236.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems.

The object of the invention is to provide a triple valve having the usual functions of triple valves, and also providing for a quick serial action of the brakes throughout the train and for a graduated release of the brakes, as well as providing for maintaining the pressure in the brake cylinder in service applications irrespective of leakage from said cylinder, and in its preferred form also providing for the emergency application by means of the usual service brake cylinder and a second or emergency brake cylinder; and which performs these various functions by a much simpler and less complicated construction than prior valves for effecting the same results and functions.

The invention comprises the construction and arrangement of parts of a triple valve hereinafter described and claimed.

In the accompanying drawings Figures 1 and 2 are longitudinal sections through a triple valve, embodying the invention, taken on the line 1—1, Fig. 10, Fig. 1 showing the same in full release and re-charging position and Fig. 2 showing the same in emergency application position; Figs. 3, 4, 5, 6, 7, 8 and 9 are diagrammatic views showing the valve seat in plan and the slide valves in horizontal section on the line 3—3, Fig. 1, and showing different positions of the valve, Fig. 3 showing the same in full release position, Fig. 4 in quick service or quick serial application position, Fig. 5 in full service position, Fig. 6 in service lap position, Fig. 7 in graduated release position, Fig. 8 in graduated release lap position, and Fig. 9 in emergency position; Fig. 10 is a plan view of the valve seat; Fig. 11 is a vertical longitudinal section through the valve seat and valves in full release position on the line 11—11, Fig. 3; Fig. 12 is a similar view on the line 12—12, Fig. 3; Fig. 13 is an inside view of the head or cap of the valve casing; Figs. 14, 15, 16 and 17 are vertical transverse views taken respectively on the lines 14—14, 15—15, 16—16 and 17—17, Fig. 1; and Fig. 18 is a vertical section taken on the line 18—18, Fig 14.

The valve in its general form, construction and arrangement follows the standard type of Westinghouse and similar valves. It comprises a casing 1, provided at one end with a flat face 2 for connection to the auxiliary reservoir and brake cylinder, and closed at its opposite end by the head or cap 3. In said casing is the usual chamber 4 in which works the main piston 5 which is provided with a stem 6 extending into the bore 7 of the casing and actuating the slide valves. In the head or cap 3 is the usual graduating stem 8 held by the graduating spring 9 and against which the main piston abuts, as is usual in triple valves. The train or brake pipe connection is through two passages 11 extending longitudinally in the casing and meeting in a common passage 12 from which a passage 13 leads through the cap or head 3 and communicates with the piston chamber 4 through port 14. In the bushing of piston chamber 4 is the usual charging groove 15 which is open when the valve is in full release position, and through which train pipe air passes the piston and thence through the bore 7 to the auxiliary reservoir which is connected directly with the end of bore 7. In the bore 7 is a suitable bushing 16 of general U-shape, as shown in Figs. 14, 15, 16 and 17, and having its lowermost portion 17 forming a valve seat. The inner sides of the bushing are provided with longitudinal grooves 18 for receiving wings or ribs 19 on the piston stem 6 (Figs. 15, 16 and 17) in order to provide guides for the piston 5 and its stem.

The seat 17 is provided with the ports and passages shown in Fig. 10, to-wit, ports 20 and 20ª, connected together and communicating with a lateral port 21 leading to the atmosphere and forming the exhaust from the valve; a port 22 communicating directly with the central passage 23 which leads to the service brake cylinder; a port 24 communicating with a lateral port 25 leading to a supplementary reservoir; a port 26 communicating with a lateral port 27 leading to the usual reducing valve; a port 28 communicating with the longitudinal passage 29 which opens into the brake cylinder connection 23; a port 30 communicating with a vertical passage 31 which communicates with the train pipe passage 12, but in which connection there is a check valve 32 normally held seated against train pipe pressure by spring 33; a small port 34 communicating with passage 35 leading to the train pipe passage 12; two small vertical ports 36 and 37 connected by the horizontal passage 38; a port 39 communicating with a lateral port 39ª leading to the emergency brake cylinder; two small vertical ports 40 and 41 connected by the horizontal passage 42; a small vertical port 43 communicating with a transverse horizontal passage 44 opening through the side face of the seat and leading to the brake cylinder pressure retaining valve, hereinafter to be described; another small vertical port 47 communicating with a horizontal port 48 opening through the side of the valve seat and leading to the chamber of the brake cylinder pressure retaining valve, hereinafter to be described.

Coöperating with the valve seat are two slide valves, to-wit, a relatively small slide valve 50 and a larger slide valve 51. The slide valve 50 is held between an end projection 52 and a central projection 53 on the stem 6 of the main piston, so that said valve 50 at all times moves with the piston 5. The larger slide valve 51 is held between the central projection 53 and a shoulder 54 on the main piston stem, but does not fill the space between said projection and shoulder, so that there is a certain amount of lost motion which permits the main piston to move at times without moving the valve 51.

The small slide valve 50 in plan view is of the form shown in Figs. 3 to 9, not being of rectangular form, but being cut away at one end for substantially half of its width, as at 56, and on the diagonally opposite corner being cut away for substantially half its width and length, as at 57. Said valve in its lower surface is provided with a substantially square cavity 55 located on the longer side of said valve, with another cavity 58 extending for a considerable distance widthwise but only a short distance lengthwise of said valve and near one end having a longitudinal extension 59; and forward of the cavity 58 and to the side of the cavity 55 with a small L-shaped cavity 60.

The slide valve 51 is of substantially rectangular form, having its forward lower edge cut away as at 61. It is provided in its lower face with a large cavity 62 extending lengthwise of the valve and lying almost entirely on one side of the central longitudinal line of the valve, and having a lateral portion 62ª extending toward the opposite edge of the valve; and with a pair of small narrow cavities 63 and 64 extending longitudinally. The slide valves are held to the seat by the usual springs 65.

To the side of the main casing 1 is secured the pressure retaining valve casing 67, provided with a chamber or bore 68 and the enlarged piston chamber 69. Working in the piston chamber 69 is the piston 70 having a stem 71 extending into the bore of the chamber 68 and normally held in outward position by spring 72. The passage 48 which leads from the port 47 in the valve seat opens into the inner end of chamber 68. In the chamber 68 is a suitable valve seat 74 provided with a port 75 with which communicates the passage 44 leading from the small vertical port 43 in the main valve seat. The port 75 is controlled by a small slide valve 76 carried by the piston stem 71.

The outer end of the casing 67 is closed by the head 78 which provides a chamber 79 of considerable capacity outside of the piston 70. Air enters said chamber 79 through a feed opening 82 through the piston, which is controlled by check valve 83 seating toward the chamber 68 and normally held to its seat by a very light spring 85, which spring is merely strong enough to move the check valve to its seat, but without offering any material resistance to the passage of air past said check valve into the chamber 79. A groove 86 is provided in the bushing of piston chamber 69 to permit chamber 79 to vent to the atmosphere when the triple valve is in full release position.

The valve has seven positions, as follows:—

1. *Full release and re-charging position* (shown in Figs. 1, 3, 11, 12, 15, 16 and 17.)— In this position, the main piston 5 is at its extreme forward stroke so as to uncover the feeding groove 15. Train pipe air entering the valve through passages 11 passes by way of passages 12 and 13 and port 14 to the piston chamber 4, thence through feed groove 15 to the longitudinal bore 7 of the valve and thence to the auxiliary reservoir until the pressure therein equalizes with train pipe pressure. In this position the supplementary reservoir port 24 in the valve seat is uncovered so that the supplementary reservoir is also charged to the same pressure as the auxiliary reservoir. The port 30 in the valve seat is uncovered by the large slide valve 51, which allows train pipe pressure to escape past the check valve 32 and enter the bore 7 in the triple valve and go thence to the auxiliary and supplementary reservoirs. The check valve 32 will remain open until the pressure in the auxiliary and supplementary reservoirs plus the tension of spring 33 equalize with the train pipe pressure, when said check valve closes, and the further charging of the auxiliary and supplementary reservoirs is completed more slowly through the feed groove 15. The port 30 is of considerable area, being long widthwise of the valve seat and provides for quickly charging the reservoirs on a car. In this position the service brake port 22 is connected with the exhaust port 20 through the transverse cavity 58 in slide valve 50, and the emergency brake cylinder port 39 is connected to the exhaust port 20ª through the cavity 55 in slide valve 50 thereby venting both the service and emergency brake cylinders to the atmosphere and releasing the brakes. The small port 47 is also uncovered by the transverse port 58 in slide valve 50, thereby venting the pressure retaining valve chamber 68 to the atmosphere, permitting the brake cylinder pressure retaining piston 70 to move over to the extreme left hand, viewing Fig. 14, and also venting chamber 79 via groove 86 to the atmosphere, but port 43 is blanked by valve 51 so that supplementary reservoir air cannot escape through the retaining valve. This moves slide valve 76 to uncover port 75 in valve seat 74, but inasmuch as port 43 is blanked no effect is produced. All other ports in the valve seat are blanked either at one end or the other in this position of the valve.

2. *Quick service or serial venting position*, (shown in Fig. 4.)—This position is assumed upon the first movement of the main piston upon slight reduction of train pipe pressure, and results in moving the small slide valve 50 from the position shown in Fig. 3 to that shown in Fig. 4, but without moving the large slide valve 51, due to the lost motion connection between the main piston stem and said slide valve 51. In this position all the ports and passages remain as before, except that the feed groove 15, exhaust ports 20 and 20ª and small port 47 are blanked, while the supplementary reservoir port 24 is also closed, thereby trapping air in said supplementary reservoir, and a direct connection is made between the train pipe and the service brake cylinder through the port 34 in the valve seat, cavity 63 in slide valve 51, port 36, passage 38 and port 37 in the valve seat, and cavity 58 and extension 59 in the slide valve 50 to the brake cylinder port 22. The result is that the train pipe is momentarily vented into the service brake cylinder, which is at atmospheric pressure, thereby producing a drop in pressure in the train pipe at the car, and securing a quicker serial action of the brakes throughout the train. The effect is the same as though at each car the train pipe were momentarily vented to the atmosphere, to secure quicker reduction of train pipe pressure toward the rear of the train than would be possible if all the air had to flow forwardly and out at the engineer's brake valve. Instead, however, of venting the train pipe at each car to the atmosphere it is vented into the empty service brake cylinder, thereby producing a light setting of the brakes.

The emergency brake cylinder port 39, however, is blanked. The valve remains for a brief time in this position, due to the fact that the first movement of the piston 5 moves only the small slide valve 50, but as soon as the slack between the piston stem 6 and the larger slide valve 51 is taken up, the greater frictional resistance encountered momentarily checks the movement of the piston, thereby providing an appreciable time of venting the train pipe into the empty brake cylinder. The reduction of train pipe pressure caused thereby, however, produces a sufficient overbalancing of pressure on the opposite sides of the main piston to overcome the friction of both slide valves, and the valve almost immediately moves over to the next position, now to be described.

3. *Full service position*, (shown in Fig. 5.)—In this position the small slide valve 50 has moved over sufficiently so that its cutaway portion 57 uncovers the service brake cylinder port 22, allowing auxiliary reservoir air to rush into said brake cylinder, the exhaust port 20 remaining blanked, as in the previous position. The ports 34, 36, 37, 40, 41 and 43 are likewise blanked, as is also the supplementary reservoir port 24, which while it communicates with the cavity 58 is nevertheless blanked because said cavity does not extend through the slide valve. The emergency brake cylinder port is also blanked so that in this position only the service brake cylinder is supplied with air. The large slide valve 51 has been moved over so that its cavity 62 connects the brake cylinder port with a reducing valve port 26, permitting all pressure in the brake cylinder in excess of that to which the reducing valve has been set to escape to prevent flattening the wheels. The slide valve 50 has also uncovered the small port 47, permitting auxiliary reservoir pressure to go by way of passage 48 to the pressure retaining valve chamber 68, driving the piston 70 over to the position shown in Fig. 14, with slide valve 76 covering the port 75, and thence escapes past check valve 83 into chamber 79, charging said chamber 79 to substantially the point of equalization of the pressure just put into the service brake cylinder.

4. *Service lap position*, (shown in Fig. 6.)—This position is assumed on a slight recoil, such as occurs immediately after a service application, due to a momentary overbalancing of pressure on the train pipe side of the main piston. The large slide valve 51 has remained stationary, due to the lost motion connection between itself and the main piston stem, but the small slide valve 50 has moved over sufficiently to blank the service brake cylinder port 22, thereby cutting off further flow of air from the auxiliary reservoir to said brake cylinder. In this position of valve 50, the cavity 58 connects supplementary reservoir port 24 with the small port 41, so that supplementary reservoir air now passes through passage 42, port 40, cavity 64 in the slide valve 50 to the port 43, whence it goes by passage 44 to port 75 underneath small slide valve 76 of the pressure retaining valve. The chamber 68 is in communication through passage 48 with port 47, which at this time is connected by the small L-shaped cavity 60 in slide valve 50 with the brake cylinder port 22, thereby permitting the brake cylinder pressure to equalize with the pressure in chamber 79 by way of check valve 83, i. e. flow from the brake cylinder to the chamber 79 until the pressure equalizes. Should the brake cylinder leak off appreciably, it reduces the pressure in chamber 68, thereby permitting the trapped pressure in chamber 79 to move piston 70 to the left, Fig. 14, uncovering port 75, and permitting the supplementary reservoir pressure which is acting underneath slide valve 76 to pass into the chamber 68 and thence by way of passage 48, port 47, and L-shaped cavity 60 to the service brake cylinder. This replenishes the service brake cylinder from the supplementary reservoir. As soon as the pressure in the service brake cylinder is again brought up, it re-acts in chamber 68 against piston 70, moving the same back to original position and covering port 75 by slide valve 76. The retaining valve remains in this position until the pressure in the brake cylinder has again been substantially reduced, when the trapped pressure in chamber 79 again moves the piston to the left, uncovering port 75, and again permitting supplementary reservoir pressure to flow to the brake cylinder. These movements continue as long as the brake cylinder continues to leak off, and results in maintaining the pressure in the brake cylinder to the desired degree, and provides a simple means for replenishing said pressure from the supplementary reservoir in which the pressure is still higher than in the auxiliary reservoir which has been partly equalized into the brake cylinder. As soon as the main valve goes to full release position the pressure in chamber 79 forces the piston 70 entirely over to the left, thus uncovering groove 86 and permitting pressure from chamber 79 to be exhausted to the brake cylinder and thence to the atmosphere. As soon as pressure on both sides of the piston 70 is exhausted, spring 72 moves the piston and valve 76 back to normal or neutral position.

5. *Graduated release position*, (shown in Fig. 7.)—This position is assumed upon a slight increase of train pipe pressure after a service application, to move the valves 50 and 51 partly toward release position and slowly release the brakes. In this position the large slide valve 51 blanks the connection between the brake cylinder port 28 and the reducing valve port 26. The supplementary reservoir port 24 is also partly uncovered by slide valve 50, so that said reservoir replenishes the auxiliary reservoir to the point of equalization with the increased train pipe pressure. The important change, however, is that the cavity 58 in slide valve 50 partly uncovers brake cylinder port 22 and exhaust port 20, permitting the brake cylinder to slightly vent to the atmosphere. The valve remains in this position only momentarily, as the slight recoil which always occurs after movement of the valve, moves the same back to blank the connection between the brake cylinder port 22 and exhaust port 20, but by again slightly increasing the train pipe pressure the valve 50 can be repeatedly moved to the position shown in Fig. 7 and the brakes graduated off. The cavity 55 partly uncovers the emergency brake cylinder port 39, but no effect is produced since it also partly uncovers exhaust port 20 and fully uncovers exhaust port 20ª.

6. *Graduated release lap position*, (shown in Fig. 8.)—This position is due to the slight recoil above referred to or by the slight increase of auxiliary reservoir pressure over train pipe pressure, due to the high pressure from the supplementary reservoir replenishing the auxiliary reservoir by way of port 24 when the valve is in graduated release position shown in Fig. 7. The larger slide valve 51 has remained stationary, but the small slide valve 50 has been moved sufficiently to blank the connection between the brake cylinder port 22 and the exhaust port 20, and also to blank the supplementary reservoir port 24 and the emergency brake cylinder port 39. All the other ports are also blanked, except that small port 47 is connected by the L-shaped cavity 60 with the brake cylinder port 22. Inasmuch, however, as pressure in the brake cylinder is substantially equal to that in the chamber 68 of the pressure retaining valve, no effect is produced on the pressure retaining valve.

7. *Emergency position*, (shown in Figs. 2 and 9.)—This position is assumed upon a large reduction in train pipe pressure, which causes the main piston 5 to compress the graduating spring 9 and move fully over to its left hand position, thereby dragging with it both slide valves. In this position the exhaust ports 20 and 20ª are of course blanked, as is also port 26 leading to the reducing valve. Both the service brake cylinder port 22 and the emergency brake cylinder port 39, as well as the supplementary reservoir port 24 are fully uncovered, and consequently both brake cylinders are supplied with air from both the auxiliary and supplementary reservoirs. The small port 47 is also uncovered, but inasmuch as its main purpose was to replenish brake cylinder pressure from the supplementary reservoir, it has no function in the emergency position. The high pressure in the brake cylinders passes back into the pressure retaining valve chamber 68 from port 47 and passages 48 and 49, and charges the chambers 68 and 79 to the same pressure as in the brake cylinders. The slide valve 51 has also been moved over until its cavity 62 connects the brake cylinder port 28 with the train pipe port 30, so that train pipe pressure can pass the check valve 32 and rush to the service brake cylinder. Inasmuch as the service brake cylinder port 22 is in direct connection with the emergency brake cylinder port 39, the emergency brake cylinder also receives some of the train pipe air. This flow of train pipe air continues until the brake cylinder pressure plus the tension of spring 33 overbalances train pipe pressure. Consequently, in an emergency application the brake cylinders are supplied with air from the train pipe during the early part of the application, thereby securing a quick serial action of the brakes throughout the train by reduction of train pipe pressure at each car, but as soon as brake cylinder pressure overcomes train pipe pressure the check valve 32 closes, and thereafter the application is completed by the equalization of the auxiliary and supplementary reservoir pressures with the service and the emergency brake cylinders.

The emergency position of the valve can be secured either directly from full release position, or from any of the other positions of the valve, by merely reducing the train pipe pressure below the point of equalization of auxiliary reservoir pressure with the brake cylinder.

The valve described has all of the usual functions of triple valves, including a quick service or serial venting position to secure the rapid serial action of the brakes throughout the train, also a graduated releasing of the brakes, and also means for replenishing the pressure in the service brake cylinder during service applications from the supplementary reservoir, in addition to the usual service application and emergency application positions, as well as enabling the brakes to be held in any of the positions by lapping the valve. The valve, therefore, performs all of the functions of the most approved triple valves, but by a mechanical construction which is very much simpler and less complicated than existing valves which perform all of the functions of this valve, so the valve not only is cheaper in first cost, but is more reliable in action, less liable to get out of repair, cheaper in its upkeep, and offers less resistance to movement than similar valves for securing the same functional effects.

The brake cylinder pressure retaining features during service application are in no way dependent upon the use of an emergency brake cylinder, and such pressure retaining or replenishing features can be used in a triple valve of the construction described which omits the emergency brake cylinder port 39 and the parts coöperating therewith.

What I claim is:

1. A triple valve having connections to the atmosphere, train pipe, brake cylinder, and auxiliary reservoir, ports and valve mechanism arranged on service reduction of train pipe pressure to admit air from the auxiliary reservoir to the brake cylinder, and in lap position to open communication between the brake cylinder and a supplementary valve device, and a supplementary valve device controlled solely by pressure from the brake cylinder and arranged when the main valve is in service lap position to admit air from a source of fluid pressure to the brake cylinder upon reduction of pressure in the brake cylinder.

2. A triple valve having connections to the atmosphere, train pipe, brake cylinder, and auxiliary reservoir, ports and valve mechanism arranged on service reduction of train pipe pressure to admit air from the auxiliary reservoir to the brake cylinder, a supplementary valve controlling a connection from a source of fluid pressure to the brake cylinder, a movable abutment for actuating said supplementary valve, and connections whereby the pressures on opposite sides of said movable abutment equalize with the brake cylinder, the connection from the cylinder to one side of the movable abutment being open during service lap position and the connection to the opposite side being past a check valve.

3. A triple valve having connections to the atmosphere, train pipe, brake cylinder, and auxiliary reservoir, ports and valve mechanism arranged on service reduction of train pipe pressure to admit air from the auxiliary reservoir to the brake cylinder, a supplementary valve controlling a connection from a source of fluid pressure to the brake cylinder, and a movable abutment for actuating said supplementary valve, said main valve being arranged in service position to admit air to both sides of said movable abutment and in service lap position to equalize the pressure on both sides of the movable abutment with the brake cylinder and trap the air on one side of said movable abutment.

4. A triple valve having connections to the atmosphere, train pipe, brake cylinder, and auxiliary reservoir, ports and valve mechanism arranged on service reduction of train pipe pressure to admit air from the auxiliary reservoir to the brake cylinder, a supplementary valve controlling communication from a source of fluid pressure to the brake cylinder, and a movable abutment for actuating said supplementary valve, said main valve being arranged in service lap position to equalize pressures on opposite sides of said movable abutment with the brake cylinder, one side of said movable abutment being in open communication with the brake cylinder and the other side being in communication with the brake cylinder past a check valve, whereby reduction of brake cylinder pressure opens communication from the supplementary reservoir to the brake cylinder.

5. A triple valve having connections to the atmosphere, train pipe, brake cylinder, auxiliary reservoir and a supplementary reservoir, ports and valve mechanism arranged on service reduction of train pipe pressure to admit air from the auxiliary reservoir to the brake cylinder, and a supplementary valve including a movable abutment, said main valve mechanism being arranged in service lap position to equalize the pressures on both sides of said supplementary movable abutment with the brake cylinder, one side of said movable abutment being in open communication with the brake cylinder and the other side being in communication with the brake cylinder past a check valve, and a supplementary valve actuated by the supplementary movable abutment and arranged to control communication from the supplementary reservoir to the open passage to the brake cylinder.

6. A triple valve having connections to the atmosphere, train pipe, brake cylinder and auxiliary reservoir, said triple valve comprising a movable abutment open to train pipe pressure on one side and auxiliary reservoir pressure on the opposite side, a pair of slide valves actuated thereby, one of said slide valves having a lost motion connection with the movable abutment, ports controlled by said valves and arranged on service reduction of train pipe pressure to admit air from the auxiliary reservoir to the brake cylinder, and in lap position to open communication between the brake cylinder and a supplementary valve device, and a supplementary valve device controlled solely by pressure from the brake cylinder and arranged when the main valve is in service lap position to admit air from a source of fluid pressure to the brake cylinder upon reductions of pressure in the brake cylinder.

7. A triple valve having connections to the atmosphere, train pipe, brake cylinder and auxiliary reservoir, said triple valve including a movable abutment open on one side to train pipe pressure and on its opposite side to auxiliary reservoir pressure, a pair of slide valves actuated by said movable abutment, one of said slide valves having a lost motion connection with the movable abutment, ports controlled by said valves and arranged on service reduction of train pipe pressure to admit air from the auxiliary reservoir to the brake cylinder, and in lap position to open communication between the brake cylinder and a supplementary valve device, a supplementary valve controlling communication from a source of fluid pressure to the brake cylinder, and a movable abutment actuating said supplementary valve, one side of said supplementary movable abutment when the main valve is in service lap position being open to the brake cylinder and the other side being in communication with the brake cylinder past a check valve, whereby reduction in brake cylinder pressure causes said supplementary movable abutment to move to supply fluid pressure to the brake cylinder.

8. A triple valve having connections to the atmosphere, train pipe, brake cylinder, auxiliary reservoir and a supplementary reservoir, said triple valve including a movable abutment actuated by variations in train pipe pressure, a pair of slide valves actuated by said movable abutment, one of said slide valves having a lost motion connection with the movable abutment, ports controlled by said valves and arranged on service reduction of train pipe pressure to admit air from the auxiliary reservoir to the brake cylinder, a supplementary valve controlling communication from the supplementary reservoir to the brake cylinder, and a movable abutment for actuating said supplementary valve, said main slide valves being arranged in service lap position to equalize pressures on the two faces of said supplementary movable abutment with the brake cylinder, the equalization with one side being through an open passage from the brake cylinder and with the opposite side being past a check valve, whereby upon reduction of brake cylinder pressure when the main valve is in service lap position, said supplementary movable abutment is moved to admit air from the supplementary reservoir to the brake cylinder.

9. A triple valve having connections to the atmosphere, train pipe, brake cylinder, and auxiliary reservoir, ports and valve mechanism arranged on light reduction in train pipe pressure to admit air from the train pipe to the brake cylinder and on service reduction of train pipe pressure to admit air from the auxiliary reservoir to the brake cylinder, and a supplementary valve controlled by brake cylinder pressure and arranged when the main valve is in service lap position to admit fluid pressure to the brake cylinder upon reduction of pressure in the brake cylinder.

10. A triple valve having connections to the atmosphere, train pipe, brake cylinder and auxiliary reservoir, ports and valve mechanism arranged on light reduction in train pipe pressure to admit air from the train pipe to the brake cylinder and on service reduction of train pipe pressure to admit air from the auxiliary reservoir to the brake cylinder, a supplementary valve controlling a connection from a source of fluid pressure to the brake cylinder, a movable abutment for actuating said supplementary valve, and connections whereby the pressures on opposite sides of said movable abutment equalize with the brake cylinder, the connection from the cylinder to one side of the movable abutment being open during service lap position and the connection to the opposite side being past a check valve.

11. A triple valve having connections to the atmosphere, train pipe, brake cylinder and auxiliary reservoir, ports and valve mechanism arranged on light reduction in train pipe pressure to admit air from the train pipe to the brake cylinder and on service reduction of train pipe pressure to admit air from the auxiliary reservoir to the brake cylinder, a supplementary valve controlling a connection from a source of fluid pressure to the brake cylinder, and a movable abutment for actuating said supplementary valve, said main valve being arranged in service position to admit air to both sides of said supplementary movable abutment, and in service lap position to equalize the pressures on opposite sides of said movable abutment with the brake cylinder and trap the air on one side of said movable abutment.

12. A triple valve having connections to the atmosphere, train pipe, brake cylinder and auxiliary reservoir, said triple valve comprising a movable abutment actuated by variations in train pipe pressure, a pair of slide valves actuated thereby, one of said slide valves having a lost motion connection with the movable abutment, ports controlled by said valves and arranged on light reduction in train pipe pressure to admit air from the train pipe to the brake cylinder and on service reduction of train pipe pressure to admit air from the auxiliary reservoir to the brake cylinder, and a supplementary valve controlled by brake cylinder pressure and arranged when the main valve is in service lap position to supply fluid pressure to the brake cylinder upon reduction of pressure in the brake cylinder.

13. A triple valve having connections to the atmosphere, train pipe, brake cylinder and auxiliary reservoir, said triple valve including a movable abutment actuated by variations in train pipe pressure, a pair of slide valves actuated by said movable abutment, one of said slide valves having a lost motion connection with the movable abutment, ports controlled by said valves and arranged on light reduction in train pipe pressure to admit air from the train pipe to the brake cylinder and on service reduction of train pipe pressure to admit air from the auxiliary reservoir to the brake cylinder, a supplementary valve controlling communication from a source of fluid pressure to the brake cylinder, and a movable abutment for actuating said supplementary valve, one side of said supplementary movable abutment when the main valve is in service lap position being in open communication with the brake cylinder and the other side being in communication with the brake cylinder past a check valve, whereby reductions in brake cylinder pressure cause said supplementary movable abutment to move to admit air from the supplementary reservoir to the brake cylinder.

14. A triple valve having connection to the atmosphere, train pipe, brake cylinder, auxiliary reservoir and a supplementary reservoir, ports and valve mechanism arranged on service reduction of train pipe pressure to admit air from the auxiliary reservoir only to the brake cylinder, and on emergency reduction of train pipe pressure to admit air from both reservoirs to the brake cylinder, and a supplementary valve controlled by brake cylinder pressure and arranged when the main valve is in service lap position to admit air from the supplementary reservoir to the brake cylinder upon reduction of pressure in the brake cylinder.

15. A triple valve having connections to the atmosphere, train pipe, brake cylinder, auxiliary reservoir and a supplementary reservoir, ports and valve mechanism arranged on service reduction of train pipe pressure to admit air from the auxiliary reservoir only to the brake cylinder, and on emergency reduction of train pipe pressure to admit air from both reservoirs to the brake cylinder, a supplementary valve controlling communication from the supplementary reservoir to the brake cylinder, a movable abutment for actuating said supplementary valve, and connections whereby the pressures on opposite sides of said movable abutment equalize with the brake cylinder, the connection from the cylinder to one side of the movable abutment being open during service lap position and the connection to the opposite side being past a check valve.

16. A triple valve having connections to the atmosphere, train pipe, brake cylinder, auxiliary reservoir and a supplementary reservoir, said triple valve being arranged on service reduction of train pipe pressure to admit air from the auxiliary reservoir to the brake cylinder and trap the air in the supplementary reservoir, a supplementary valve controlling communication from the supplementary reservoir to the brake cylinder, and a movable abutment for actuating said supplementary valve, one side of said supplementary movable abutment when the main valve is in service lap position being in open communication with the brake cylinder through the triple valve and the other side being open to a chamber containing a trapped body of fluid under pressure, whereby reduction in brake cylinder pressure causes said supplementary valve to admit air from the supplementary reservoir to the brake cylinder.

17. A triple valve having connections to the atmosphere, train pipe, brake cylinder, auxiliary reservoir and a supplementary reservoir, said triple valve including a movable abutment actuated by variations in train pipe pressure, valve mechanism actuated by said piston and arranged on service reduction of train pipe pressure to admit air from the auxiliary reservoir to the brake cylinder and trap the air in the supplementary reservoir, a supplementary valve controlling communication from the supplementary reservoir to the brake cylinder, and a movable abutment for actuating said supplementary valve, said main valve being arranged in service lap position to equalize pressures on the two faces of said supplementary movable abutment with the brake cylinder, the equalization with one side being through an open passage from the brake cylinder and with the opposite side being past a check valve, whereby upon reductions of brake cylinder pressure when the main valve is in service lap position said supplementary valve is moved to admit air from the supplementary reservoir to the brake cylinder.

18. In a fluid pressure brake, the combination of a valve device having connections to the train pipe, brake cylinder, auxiliary reservoir and a supplementary reservoir and operating by variations in train pipe pressure, and a supplementary valve device including a movable abutment open on one side to the brake cylinder and on its opposite side connected to the brake cylinder past a check valve, and a valve actuated by said movable abutment and arranged when the pressure on the brake cylinder side of said abutment falls to connect the supplementary reservoir to the brake cylinder, said supplementary valve device being arranged upon exhaustion of the brake cylinder to connect the opposite side of said abutment to the atmosphere.

19. In a fluid pressure brake, the combination of a valve device having connections to the train pipe, brake cylinder, auxiliary reservoir and atmosphere and operating by variations in train pipe pressure, a pressure thereto equal to the brake cylinder pressure chamber, means arranged to admit pressure and trap the same therein, and a valve device actuated by the pressure in said chamber and arranged upon diminution of brake cylinder pressure to admit fluid pressure to said brake cylinder and upon exhaustion of the brake cylinder to connect said pressure chamber to the atmosphere.

20. In a fluid pressure brake, the combination of a valve device comprising a chamber, a movable abutment therein open on one side to the brake cylinder and having connection to its opposite side with the brake cylinder past a check valve, and a valve actuated by said movable abutment and arranged upon diminution of pressure on the brake cylinder side of said abutment to connect a source of fluid pressure to the brake cylinder, and upon equalization of pressure on opposite faces of said abutment to break said connection, said valve device being arranged upon exhaustion from the brake cylinder side of said abutment to connect the opposite side thereof to the atmosphere.

21. In a fluid pressure brake, a valve device including a casing, a movable abutment therein, direct connections from one side of said movable abutment to the brake cylinder, connections to the opposite side of said abutment to the brake cylinder past a check valve, and a valve actuated by said movable abutment and arranged upon slight reduction of pressure on the brake cylinder side of said abutment to connect a source of fluid pressure with said brake cylinder and upon equalization of pressures on the opposite sides of said abutment to break said connection, said valve device being arranged upon exhaustion of pressure on the brake cylinder side of said abutment to exhaust the fluid pressure from the opposite side of said abutment.

22. In a fluid pressure brake, the combination of a valve device having connections to the train pipe, brake cylinder, auxiliary reservoir and a supplementary reservoir and operating by variations in train pipe pressure, and a supplementary valve device including a movable abutment open on one side to the brake cylinder and open on its opposite side to the brake cylinder past a check valve, and a slide valve actuated by said movable abutment and controlling communication between the supplementary reservoir and the brake cylinder and arranged to open said connection upon reduction of pressure on the brake cylinder side of said movable abutment, said supplementary valve device being arranged upon exhaustion of pressure on the brake cylinder side of said movable abutment to connect the other side thereof to the atmosphere.

23. In a fluid pressure brake, the combination of a valve device having connections to the train pipe, brake cylinder, auxiliary reservoir and a supplementary reservoir and operating by variations in train pipe pressure, and a supplementary valve device including a movable abutment open on one side to the brake cylinder and open on its opposite side to a brake cylinder past a check valve, a slide valve actuated by said movable abutment and controlling communication between the supplementary reservoir and the brake cylinder and arranged to open said connection upon reduction of pressure on the brake cylinder side of said movable abutment, and a spring acting against said movable abutment in opposition to the pressure on the side of said movable abutment open to the brake cylinder past the check valve, said supplementary valve device being arranged upon exhaustion of pressure from the brake cylinder side of said movable abutment to connect the other side thereof to the atmosphere.

In testimony whereof, I have hereunto set my hand.

JACOB RUSH SNYDER.

Witnesses:
F. W. WINTER,
MARY E. CAHOON.

Copies of this patent may be obtained for five cents each, by addressing the "Commissioner of Patents, Washington, D. C."